(12) United States Patent
Matsuo et al.

(10) Patent No.: US 9,363,988 B2
(45) Date of Patent: Jun. 14, 2016

(54) SPINNING REEL

(71) Applicant: Shimano Inc., Sakai, Osaka (JP)

(72) Inventors: Shingo Matsuo, Osaka (JP); Hirokazu Hiraoka, Osaka (JP); Keigo Kitajima, Osaka (JP)

(73) Assignee: Shimano Inc., Osaka (JP)

( * ) Notice: Subject to any disclaimer, the term of this patent is extended or adjusted under 35 U.S.C. 154(b) by 101 days.

(21) Appl. No.: 14/451,225

(22) Filed: Aug. 4, 2014

(65) Prior Publication Data

US 2015/0048193 A1 Feb. 19, 2015

(30) Foreign Application Priority Data

Aug. 16, 2013 (JP) .................. 2013-169120

(51) Int. Cl.
*A01K 89/01* (2006.01)
(52) U.S. Cl.
CPC ............. *A01K 89/0114* (2013.01); *A01K 89/01* (2013.01)
(58) Field of Classification Search
CPC ............ A01K 89/01; A01K 89/01121; A01K 89/01123; A01K 89/01143
See application file for complete search history.

(56) References Cited

U.S. PATENT DOCUMENTS

| | | | | |
|---|---|---|---|---|
| 5,601,244 A * | 2/1997 | Kawabe | ................. | A01K 89/01 242/232 |
| 6,533,202 B1 * | 3/2003 | Koike | .................... | A01K 89/01 242/310 |
| 2008/0149750 A1 * | 6/2008 | Kitajima | ................ | A01K 89/01 242/224 |
| 2009/0072066 A1 * | 3/2009 | Saito | .................. | A01K 89/0114 242/273 |
| 2014/0231569 A1 * | 8/2014 | Hui | ..................... | A01K 89/0111 242/234 |

FOREIGN PATENT DOCUMENTS

| | | |
|---|---|---|
| JP | 2007-75074 A | 3/2007 |
| JP | 2007-97424 A | 4/2007 |
| JP | 2008-154482 A | 7/2008 |

OTHER PUBLICATIONS

European Search Report of corresponding EP Application No. 14 18 0620.8 dated Feb. 4, 2015.

* cited by examiner

*Primary Examiner* — Emmanuel M Marcelo
(74) *Attorney, Agent, or Firm* — Global IP Counselors

(57) ABSTRACT

A spinning reel for forwardly unreeling a fishing line includes a reel main body having a through-hole extending through the peripheral wall in a longitudinal direction of the spinning reel, a handle configured to wind a fishing line, and being rotatably mounted to the reel main body. A screw member has a screw head disposed on a first end, a screw shaft section extending from the screw head toward a second end, and male threads disposed on the screw shaft section, the screw head contacting a peripheral wall at the front end side of the through-hole and the screw shaft section extending through the through-hole. A stopper member is mounted to the screw shaft section and contacts a periphery of the rear end side of the through-hole. A cover member has a fixed section fixed by the screw member, and covers a rear of the reel main body.

8 Claims, 10 Drawing Sheets

SPINNING REEL

CROSS-REFERENCE TO RELATED APPLICATIONS

This application claims priority to Japanese Patent Application No. 2013-169120, filed on Aug. 16, 2013. The entire disclosure of Japanese Patent Application No. 2013-169120 is hereby incorporated herein by reference.

BACKGROUND

1. Field of Invention

The present invention relates to a fishing reel, especially to a spinning reel that can forwardly unreel a fishing line.

2. Background Information

The reel main body of the spinning reel comprises a housing section that has an opening and to which a mechanism is mounted, and at least one lid member that closes the opening and that can form a mechanism mounting space between the housing section and the reel body. The spinning reel further comprises a cover member that covers the housing section and the rear of the lid member on the reel main body, and is conventionally known (refer to, for example, Japanese Laid-Open Patent Publication No. 2008-154482). In a conventional spinning reel, the cover member is fixed to the housing section by a screw member that is retained inside of the housing section. With this configuration, the head of the screw member will not appear externally in the spinning reel, so a luxurious external appearance can be obtained.

When retaining a screw member from the housing section side, keeping the screw member from falling off inside of the housing section until the incorporation of the mechanism into the housing section has been completed and until the lid member is attached to the housing section and the opening is closed is necessary, after which the cover member is attached to the housing section and the rear of the lid member. The screw member that is retained in the housing section is tightened to the cover member with a tool such as a screwdriver from the outside of the housing section. Therefore, in the spinning reel of Japanese Laid-Open Patent Publication No. 2008-154482, a tubular retaining member that retains the head of the screw member is installed integrally with or separately from the reel main body, so that the screw member can be retained inside of the reel main body until the cover member is screwed on with a tool such as a screwdriver.

SUMMARY

In a conventional spinning reel, a retaining member that retains the head of the screw member is formed integrally with or separately from the reel main body. For this reason, the structure to retain the screw member in the reel main body is complex.

The object of the present invention is to attach a cover member to a reel main body of a spinning reel so as to hide the screw head of a screw member, and so that the screw member can be retained to the reel main body with a simple structure.

The spinning reel according to the present invention is a reel that can forwardly unreel a fishing line. The spinning reel comprises a reel main body, a screw member, a stopper member, and a cover member. A handle for winding the fishing line is rotatably mounted to the reel main body. The reel main body comprises a peripheral wall and a through-hole that penetrates the peripheral wall in aback-and-forth direction. The screw member comprises a screw head and a screw shaft section. The screw head is disposed on a first end and can come into contact with the peripheral wall at the front end side of the through-hole. The screw shaft section extends from the screw head toward the second end, extending through the through-hole, and a male thread portion is disposed on at least one part of the screw shaft section. The stopper member is mounted to the screw shaft section and can come into contact with the periphery of the rear end side of the through-hole. The cover member has a fixed section that is fixed by the screw member and that covers the rear of the reel main body.

In this spinning reel, when retaining the screw member, the screw member extends through the through-hole that is disposed in the peripheral wall, and the second end of the screw shaft section protrudes from the through-hole. When the stopper member is mounted to the second end of this protruding screw shaft section, the stopper member can come into contact with the periphery of the rear end side of the through-hole, and the screw head of the screw member can come into contact with the peripheral wall at the front end side of the through-hole; therefore, with the screw head and the stopper, member, the screw member is less likely to come out of the through-hole. Here, since the through-hole is disposed between the screw head and the stopper member that is mounted to the screw shaft section, the screw member is less likely to come out of the through-hole, and retaining the screw member on the reel main body with a simple structure is possible.

The stopper member can be made of an elastic body. In this case, since the stopper member can be elastically mounted to the screw member, attaching the stopper member is easy.

The stopper member can be made of synthetic resin. In this case, obtaining a stopper member with a shape that matches the screw member is easy.

The stopper member can be an O-ring through which the screw member can extend. In this case, the O-ring can be elastically mounted to the screw member; if a commercially available sealing O-ring is used, a cheap stopper member can be obtained, and the through-hole can be sealed.

The stopper member can also comprise a flange section and a tubular section. The flange section has a larger diameter than the through-hole that is installed in the reel main body. The screw member can pass through the inner periphery of the tubular section, and the outer periphery can be fitted to the through-hole. In this case, for example, by making the inner diameter of the through-hole slightly smaller than the outer shape of the screw member, the screw member can be retained to the tubular section. Specifically, in the case of using a tapping screw as the screw member, the screw member can be retained by a female thread portion with a weak retaining force.

The flange section can also comprise a rotation stop portion, rotation of which is stopped by contacting the reel main body. In this case, the rotation stop portion protrudes rectangularly in the radial direction. The rotation stop portion can prevent the stopper member from rotating when screwing in the screw member to the stopper member.

The fixed section can also comprise a boss portion that is screwed to the male thread portion and that can come into contact with the stopper member. In this case, with the boss portion coming into contact with the stopper member, the gap between the boss portion, the screw shaft section, and the reel main body can be sealed by the stopper member.

The spinning reel can further comprise a spool shaft, a spool, a rotor, a rotor drive mechanism, and an oscillating mechanism. The spool shaft is movably mounted to the reel main body along the back-and-forth direction i.e., a longitudinal direction of the spinning reel). The spool is disposed on the front end section of the spool shaft, and the fishing line is wound to the outer periphery of the spool. The rotor is rotatably mounted to the outer periphery side of the spool and winds the fishing line to the spool according to the rotation of the handle. The rotor drive mechanism transmits the rotation of the handle to the rotor and rotates the rotor in conjunction with the rotation of the handle. The oscillating mechanism moves the spool back and forth in conjunction with the rotation of the handle via the spool shaft. The oscillating mechanism comprises a spiral shaft and a slider. On the outer periphery section of the spiral shaft is a spiral groove that rotates in conjunction with the rotation of the handle. The slider engages the spiral groove of the spiral shaft and moves back and forth in conjunction with the rotation of the spiral shaft. The screw shaft section further comprises a guide section that guides the back-and-forth movement of the slider between the screw head and the male thread portion.

In this case, since a screw member for attaching the cover member to the reel main body and the guide shaft of the oscillating mechanism can be used together, the structure for attaching the cover member is simplified.

According to the present invention, since the through-hole is disposed between the screw head and the stopper member that is mounted to the screw shaft section, the screw member is less likely to come out of the through-hole, and retaining the screw member to the reel main body with a simple structure is possible.

As described above, according to the present invention, wearing of the brake shoe of the braking operation lever disposed on the rotor braking device can be reduced while extending the adjustment range of the braking force.

DETAILED DESCRIPTION OF THE INVENTION

First Embodiment

Figure 1:
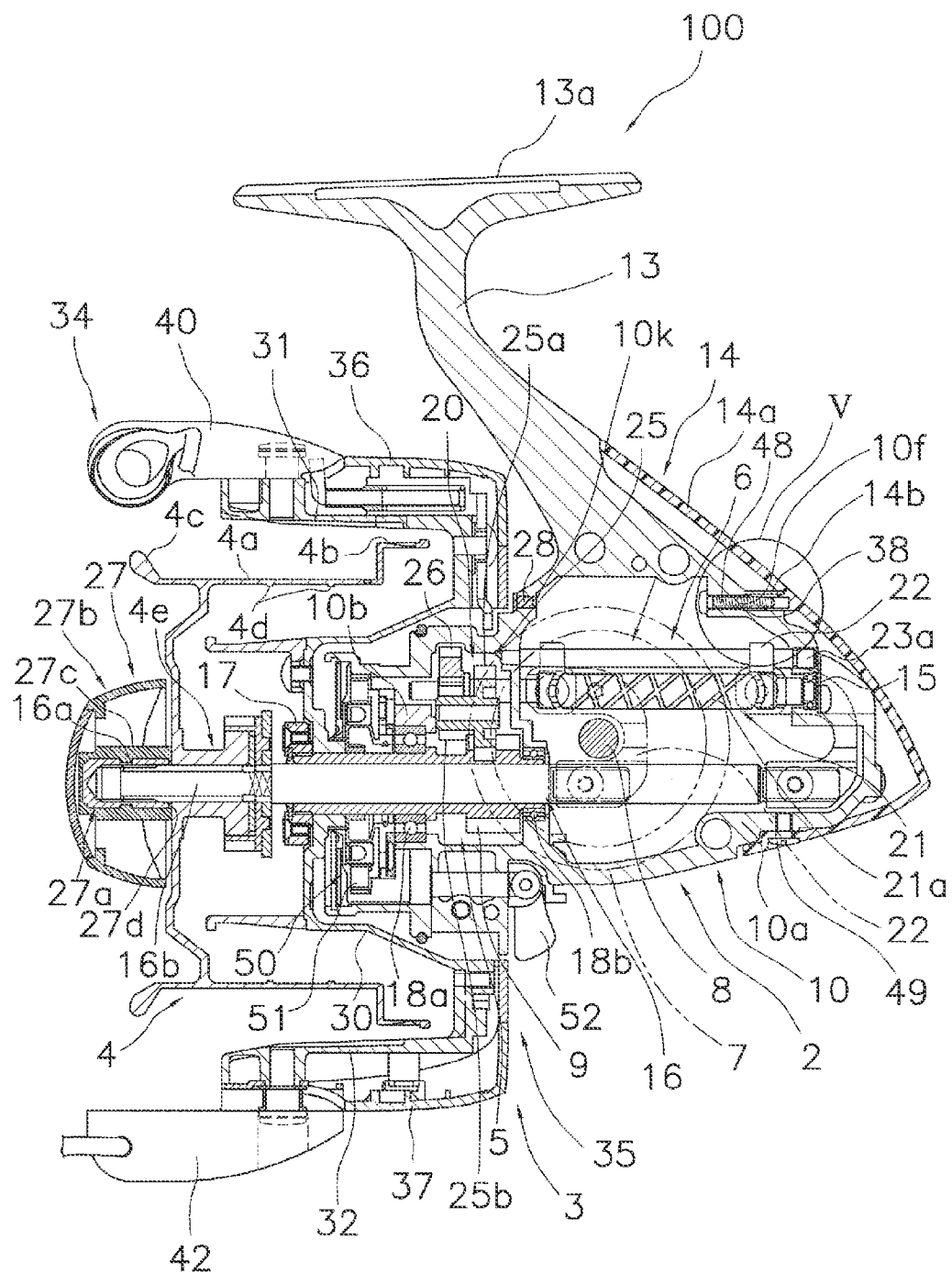
FIG. 1 is a lateral cross-sectional diagram of a spinning reel according to the first embodiment of the present invention.
Figure 2:
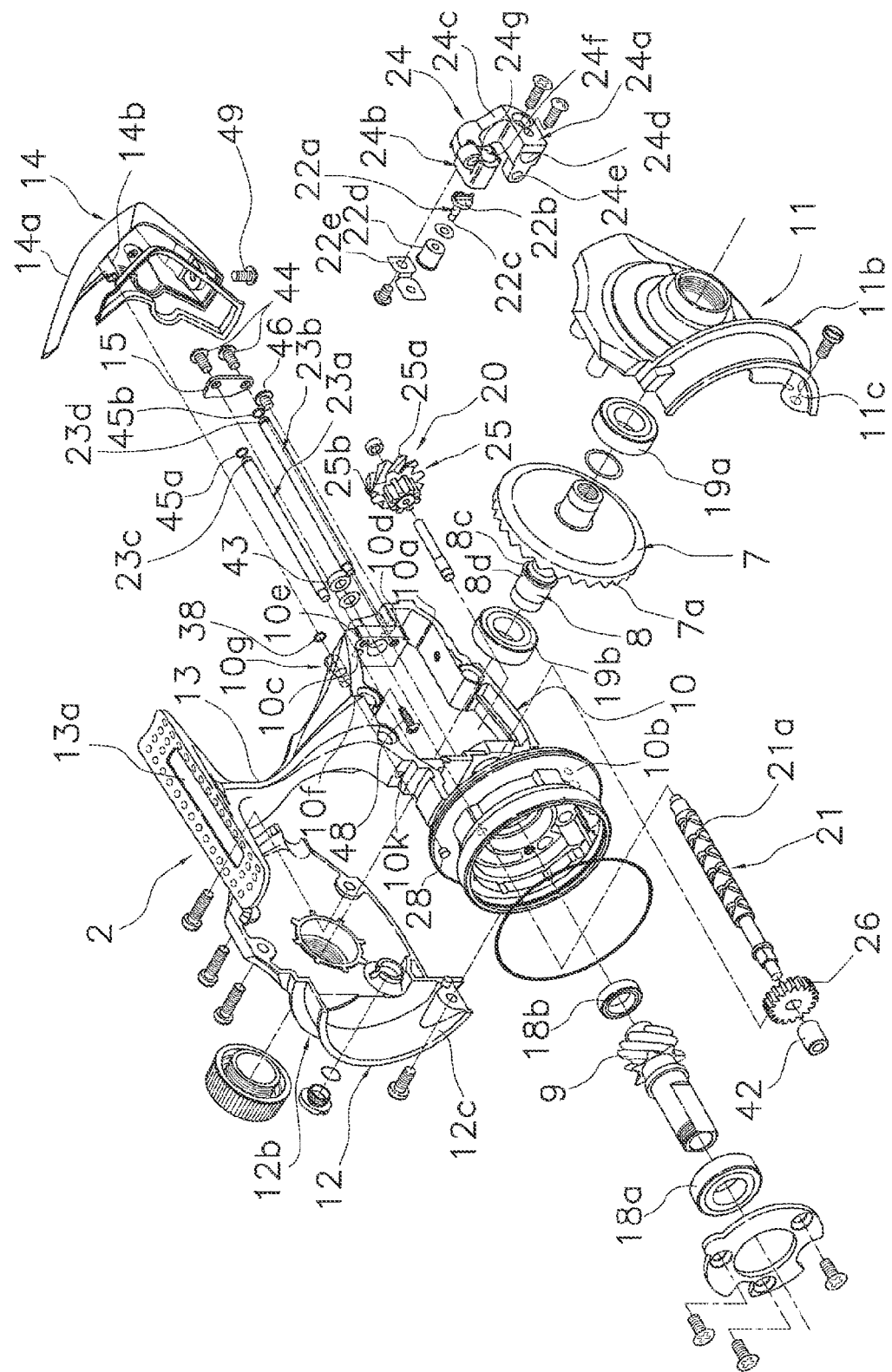
FIG. 2 is an oblique view of the spinning reel.
Figure 3:
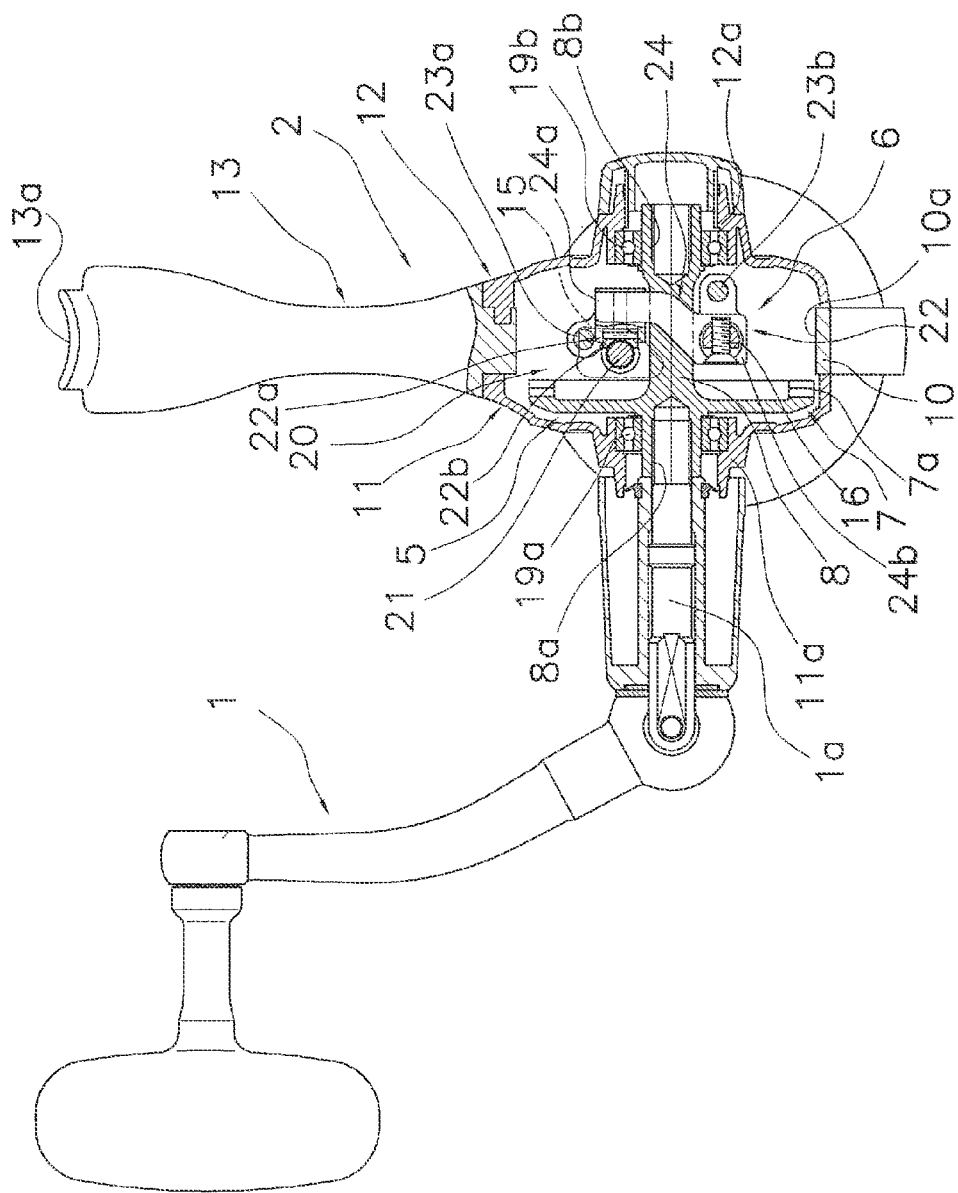
FIG. 3 is a rear cross-sectional view of the spinning reel.

The spinning reel 100 according to the first embodiment of the present invention is a reel that can forwardly unreel a fishing line. The spinning reel, as shown in FIG. 1, FIG. 2, and FIG. 3, comprises a reel main body 2, a spool shaft 16, a spool 4, a rotor 3, a rotor drive mechanism 5, and an oscillating mechanism 6. Additionally, the spinning reel 100 comprises a screw member 48, a stopper member 38, and a main body guard 14. Meanwhile, regarding the reference to back and forth herein, when fishing, the direction in which the fishing line is unreeled is forward, and the opposite direction is backward. Furthermore, left and right mean the left and right sides when looking at the spinning reel 100 from behind.

The reel main body 2 can be mounted to the fishing rod, and a handle 1 for winding the fishing line is rotatably mounted to the reel main body. The spool shaft 16 is movably mounted to the reel main body 2 along the back-and-forth direction. The spool 4 is disposed on the front end part of the spool shaft 16 and can have a fishing line wound onto the outer periphery thereof. The rotor 3 is rotatably installed on the outer periphery side of the spool 4 and winds the fishing line to the spool. 4 according to the rotation of the handle 1. The rotor drive mechanism 5 transmits the rotation of the handle 1 to the rotor 3 and rotates the rotor 3 in conjunction with the rotation of the handle 1. The oscillating mechanism 6 moves the spool 4 back and forth in conjunction with the rotation of the handle 1 via the spool shaft 16.

The screw member 48 is used to fix the main body guard 14 to the reel main body 2. The stopper member 38 is disposed on the reel main body 2 to stop the screw member 48. The main body guard 14 covers the rear part of the reel main body 2. The main body guard 14 is one example of a cover member.

The reel main body 2, as shown in FIG. 2 and FIG. 3, houses the rotor drive mechanism 5 and the oscillating mechanism 6 inside. The reel main body 2 comprises a housing section 10 that opens on both sides, a first lid member 11 and a second lid member 12 that both close the two sides of the housing section 10, a rod attaching leg unit 13 that is integrally formed with the housing section 10, and a retainer plate 15.

The housing section 10 is, for example, an aluminum alloy member. The housing section 10 is a frame-shaped member with both surfaces opened that has a peripheral wall 10a that surrounds a housing space in order to form a housing space for housing and supporting the rotor drive mechanism 5 and the oscillating mechanism 6. A disc-shaped mechanism support portion 10b is disposed on the front surface of the housing section 10, and to which are mounted a one-way clutch 51 of the reverse rotation prevention mechanism 50 mentioned below, and a pinion gear 9, etc. As shown in FIG. 2, a first through-hole 10c, a second through-hole 10d, and a third through-hole 10e are disposed in the rear part of the peripheral wall 10a of the housing section 10 for individually mounting a first guide shaft 23a and a second guide shaft 23b of the oscillating mechanism 6 mentioned below, and an axle bearing 43 for supporting the spiral shaft 21 along the back-and-forth direction.

Figure 5:
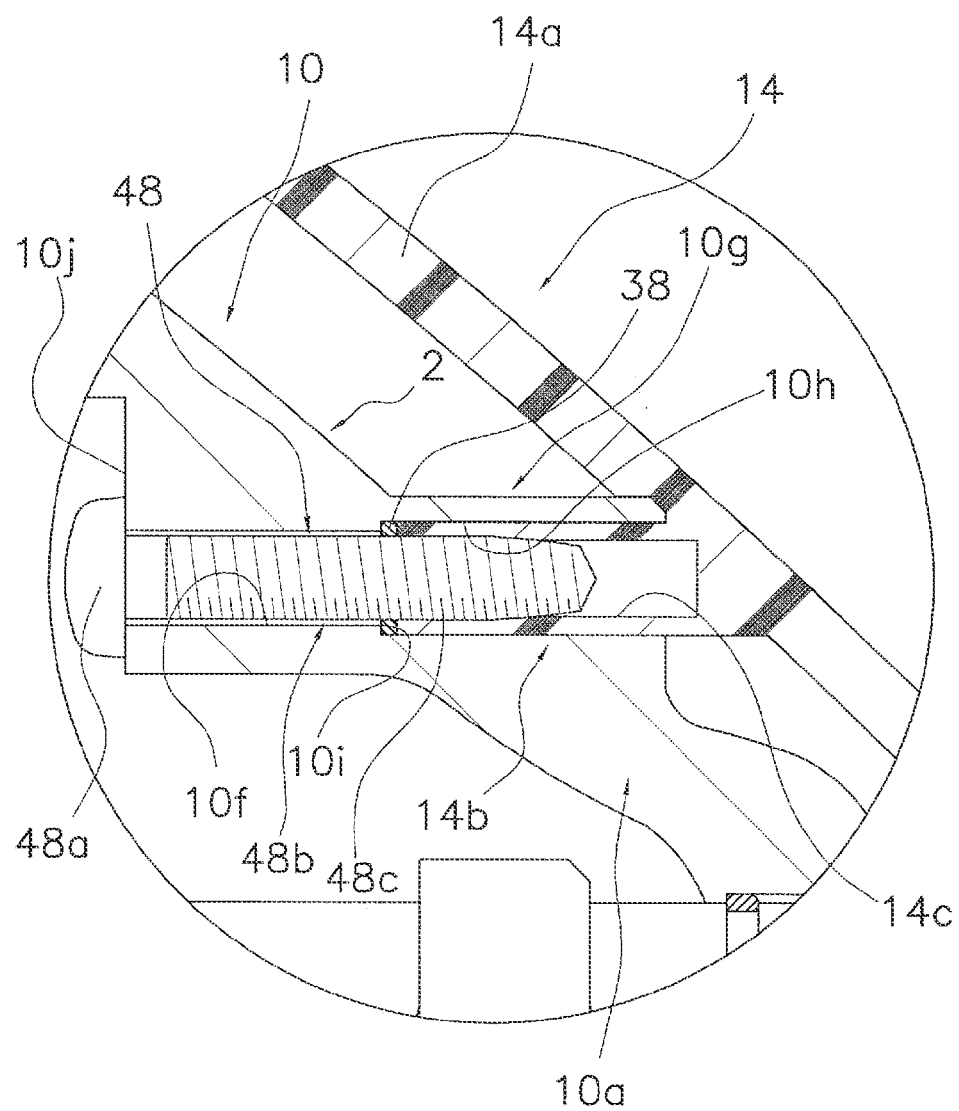
FIG. 5 is an enlarged view of part V in FIG. 1.

Additionally, as shown in FIG. 1, the peripheral wall 10a comprises a fourth through-hole 10f for mounting the screw member 48. The fourth through-hole 10f is formed extending through the peripheral wall 10a in the back-and-forth direction above the first through-hole 10c. The fourth through-hole 10f is one example of a through-hole. The fourth through-hole 10f, as shown enlarged in FIG. 5, is installed communicating with a fitting hole 10h of a guard fitting portion 10g that is formed on the peripheral wall 10a. A boss portion 14b of the main body guard. 14 mentioned below is fitted to the guard fitting portion 10g by a clearance fitting. The guard fitting portion 10g is installed to position the main body guard 14 with respect to the reel main body 2. The fitting hole 10h has an inner diameter that is larger than the fourth through-hole 10f. Around the periphery of the front end side of the fourth through-hole 10f is formed an inner wall 10j on the peripheral wall 10a that is perpendicular to the back-and-forth direction. The inner wall 10j is one example of a peripheral wall on the front end side of the through-hole. The stepped surface 10i with the fourth through-hole 10f and the fitting hole 10h is one example of a periphery of the rear end side of the through-hole. The stopper member 38 is mounted to the stepped surface 10*i* side of the fitting hole 10*h*. The stopper member 38 is mounted to the screw shaft section 48*b* of the screw member 48 mentioned below.

The first lid member 11 is, for example, an aluminum alloy member and is formed to cover one surface of the housing section 10. The first lid member 11 is disposed proximate to the drive gear 7 of the rotor drive mechanism 5. First, as shown in FIG. 3, the first lid member 11 comprises a first boss portion 11*a* that supports one end of a drive gear shaft 8 to which is installed a drive gear 7 on the back side of the drive gear 7. The first boss portion 11*a* is formed protruding outward near the central part of the wall surface of the first lid member 11. Additionally, the first lid member 11, as shown in FIG. 2, comprises, in the front part, a first flange section 11*b* that is formed in nearly a circle that forms a disc section that enters the interior of the rotor 3. Furthermore, a nearly semicircular first mechanism housing cover 11*c* is disposed in the front part of the first flange section, is disposed on the rear surface of the mechanism support portion 10*b*, and is formed so as to be nearly flush with the outer periphery surface of the mechanism support portion 10*b*.

The second lid member 12 is, for example, an aluminum alloy member and is shaped to be a mirror image that is nearly symmetrical with the first lid member 11. The second lid member 12, as shown in FIG. 2 and FIG. 3, comprises a second boss portion 12*a*, a second flange section 12*b*, and a second mechanism housing cover 12*c* that are formed in shapes that are mirror images that are nearly symmetrical with the first boss portion 11*a*, first flange section 11*b*, and the first mechanism housing cover 11*c*. For this reason, the first flange section 11*b* and the second flange section 12*b* form a circular shape with the outer periphery surface of the rear surface of the mechanism support portion 10*b* of the housing section 10. This circular part is configured to fit into the small gap on the rear surface of the rotor 3.

Meanwhile, the first lid member 11 and the second lid member 12 are fixed to the housing section 10 by a screw member, such as a round head screw.

The rod attaching leg unit 13, as shown in FIG. 1. FIG. 2, and FIG. 3, is a T-shaped member that extends upward from the housing section 10. The rod attaching leg unit 13 comprises a reel leg 13*a* that is formed at the tip and extends forward and backward. The reel leg 13*a* can be mounted on a reel sheet of a fishing rod that is not diagrammed.

The screw member 48 is, for example a tapping screw that can form a male thread portion. The screw member 48 comprises a screw head 48*a* that is installed on one end (e.g., a first end), and a screw shaft section 48*b* that extends from the screw head 48*a* toward the other end (e.g. a second end). The screw head 48*a* can come into contact with the inner wall 10*j*, which is the periphery of the front end side of the fourth through-hole 10*f*. Therefore, the screw head 48*a* has a larger diameter than the diameter of the fourth through-hole 10*f*. The screw shaft section 48*b* extends through the fourth through-hole 10*f*, and a male thread portion 48*c* is disposed on at least a part of the outer periphery surface. Therefore, the screw shaft section 48*b* is smaller in diameter than the screw head 48*a*. The screw shaft section 48*b* protrudes more than the fourth through-hole 10*f*, and the protruding other end is screwed onto the main body guard 14.

The screw member 48 is rotated by a tool such as a screwdriver, etc., that is inserted from a fifth through-hole 10*k* that is formed on the front part of the housing section 10. The fifth through-hole 10*k* is normally closed by a cap member 28 that is made of an elastic body. The cap member 28 is detachably installed on the fifth through-hole 10*k*. With this, even if a fifth through-hole 10*k* is installed, foreign objects are less likely to enter inside of the reel main body 2. During the assembly of the spinning reel 100, the screw member 48 is retained in the fourth through-hole 10*f* by a stopper member 38. The retained screw member 48 is rotated by a screwdriver that is inserted from the fifth through-hole 10*k* toward the boss portion 14*b* of the main body guard 14 mentioned below after the rotor drive mechanism 5 and the oscillating mechanism 6 are embedded in the housing section 10 and the first lid member 11 and the second lid member 12 are fixed and are screwed into the boss portion 14*b* while forming a female thread portion.

Figure 6:
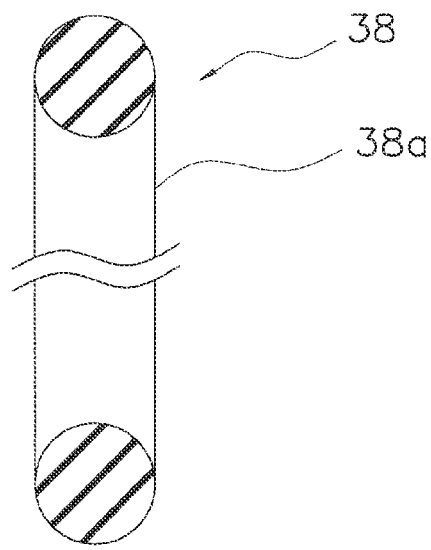
FIG. 6 is a cross-sectional view of the elastic body.

The stopper member 38 is installed to retain the screw member 48 inside of the housing section 10 until the mechanism inside of the housing section 10 is embedded, and the main body guard 14 is fixed to the housing section 10 after fixing the first Rd member 11 and the second lid member 12 to the housing section 10. As shown in FIG. 5, the stopper member 38 is annular shaped, is mounted to the screw shaft section 48*b*, and can come into contact with the stepped surface 10*i*, which is the periphery of the rear end side of the fourth through-hole 10*f*. In the first embodiment, the stopper member 38, as shown in FIG. 6, is a commercially available synthetic rubber O-ring 38*a* with a circular cross section through which the screw shaft section 48*b* of the screw member 48 can extend. The O-ring 38*a* has a smaller inner diameter than the outer shape of the screw shaft section 48*b* and has a larger outer diameter than the inner diameter of the fitting hole 10*h*. The stopper member 38 comes into contact with each of the fitting hole 10*h*, the stepped surface 10*i*, and the screw shaft section 48*b*. The stopper member 38 is installed to retain the screw member 48 so that the screw member 48 will not fall off of the housing section 10 during the assembly of the spinning reel 100, etc. Additionally, the stopper member 38 functions as a sealing member for preventing foreign matter such as dust and liquid, etc., that enter the main body guard 14 from entering the inside of the housing section 10.

The main body guard 14, as shown in FIG. 1 and FIG. 2, is formed curving so as to cover the side part and the base part of the housing section 10, the first lid member 11, and the second lid member 12 from behind when the first lid member 11 and the second lid member 12 are mounted to the housing section 10. The main body guard 14 is made of a relatively hard synthetic resin, such as an ABS resin, etc., and the surface is metal plated. The main body guard 14 comprises a guard section 14*a* that covers the housing section 10, the first lid member 11, and the second lid member 12 from behind, as well as a tubular boss portion 14*b* that extends from the inside surface of the guard section 14*a* toward the housing section 10. The boss portion 14*b* is one example of a fixed section. The main body guard 14 is fixed to the housing section 10 by a screw member 48 that is attached to the rear part of the peripheral wall 10*a* of the housing section 10 and a screw member 49 that is mounted from the lower surface of the guard section 14*a*. The boss portion 14*b* is a tubular part where the outer periphery surface fits the guard fitting portion 10*g* by clearance fitting. A screw hole 14*c* is installed in the boss portion 14*b*. In the first embodiment, the screw member 48 is a tapping screw, so the female thread portion is formed in the screw hole 14*c* by the screw member 48. However, in the case that the screw member is a normal bolt member, a female thread portion is disposed in the screw hole 14*c*.

The retainer plate 15 is disposed to retain at least a part of the first guide shaft 23*a* of the oscillating mechanism 6 mentioned below to stop the shaft and to retain an axle bearing 43 that supports the rear end of the spiral shaft 21 to stop the shaft. The retainer plate 15 is fixed to the rear surface of the housing section 10 by, for example, two screw members 44.

The rotor drive mechanism 5 comprises a drive gear shaft 8 to which a handle shaft 1a of the handle 1 is screwed in and fixed, a drive gear 7 that is formed integrally with or separately from the drive gear shaft 8, and a pinion gear 9 that meshes with the drive gear 7. In this embodiment, the drive gear 7 is integrally formed with the drive gear shaft.

The drive gear 7, as shown in FIG. 3, is, for example, an aluminum alloy face gear and is integrally formed with the drive gear shaft 8. The drive gear 7, as shown in FIG. 3, is disposed so that a gear section 7a that is configured by curved face gear teeth that mesh with the pinion gear 9 faces the right side when seen from behind.

The drive gear shaft 8 is a solid member that is integrally formed with the drive gear 7 from an aluminum alloy. The drive gear shaft 8 is rotatably supported by the first boss portion and the second boss portion 12a that are individually formed on the first lid member 11 and the second lid member 12 of the reel main body 2. Specifically, the drive gear shaft is rotatably mounted to the reel main body 2 by a first axle bearing 19a and a second axle bearing 19b that are individually mounted to the first boss portion 11a and the second boss portion 12a. The drive gear shaft 8 is formed so that the part that is straddled by the first mounting section 24a and the second mounting section 24b of the slider main body 24 mentioned below is a solid member and so that this part will be smaller in diameter than the other parts. Additionally, the drive gear shaft 8 is disposed on the fishing rod mounting side (the upper side) of the spool shaft 16. On the inner periphery section of both ends of the drive gear shaft 8 are each formed a first female thread portion 8a and a second female thread portion 8b. The first female thread portion 8a and the second female thread portion 8b are threads that tighten in the direction when the handle 1 is rotated in the line winding direction. Therefore, the first female thread portion 8a on the left side of FIG. 3 is a left-hand thread, and the second female thread portion 8b on the right side of FIG. 3 is a right-hand thread. Additionally, a large-diameter flange section 8c that comes into contact with the inner ring of the second axle bearing 19b is formed on the inner side of the axial direction of the support part of the second axle bearing 19b of the drive gear shaft 8, as shown in FIG. 2. In two places on the outer periphery surface of the flange section 8c that oppose each other notched sections 8d that are cut out in a plane are formed so that the drive gear shaft 8 can easily pass through the spool shaft 16 and the spiral shaft 21 during assembly.

Meanwhile, the handle 1 can be mounted to both ends of the drive gear shaft 8 on the left position disposed on the left side or the right position disposed on the right side of the reel main body 2. However, since the thread directions of the first female thread portion 8a and the second female thread portion 8b are different, when attaching the handle shaft 1a on the left and right, dedicated ones are prepared for each.

The pinion gear 9, as shown in FIG. 1 and FIG. 2, is a hollow tubular member, and the front part extends through the rotor 3 and non-rotatably mounts the rotor 3. As shown in FIG. 1, a spool shaft 16 extends through and is disposed in the inner peripheral part of the pinion gear 9. A nut 17 is mounted to the front part of the pinion gear 9, and the rotor 3 is integrally and rotatably coupled to the pinion gear 9 by the nut 17. The intermediate part and the rear end part of the pinion gear 9 in the axial direction are each rotatably supported by the housing section 10 of the reel main body 2 by an axle bearing 18a and an axle bearing 18b, respectively. The axle bearing 18a and the axle bearing 181 are mounted to the mechanism support portion 10b.

The oscillating mechanism 6, as shown in FIG. 1, FIG. 2, FIG. 3, and FIG. 4, is a traverse cam-type level winding mechanism. The oscillating mechanism 6 comprises a decelerating mechanism 20 (FIG. 2) that meshes with the pinion gear 9, a spiral shaft 21 that rotates in conjunction with the decelerating mechanism 20, a slider 22 that reciprocates the back-and-forth movement while engaging with the spiral shaft 21, and a first guide shaft 23a and a second guide shaft 23b that guide the slider 22 in the spool shaft 16 direction. The oscillating mechanism 6 further comprises an annular first elastic body 45a and an annular second elastic body 45b that are each individually disposed between the first guide shaft 23a and the first through-hole 10c, as well as the second guide shaft 23b and the second through-hole 10d.

The decelerating mechanism 20, as shown in FIG. 1 and FIG. 2, comprises a stepped gear 25 having a large-diameter gear 25a and a small-diameter gear 25h that mesh with the pinion gear 9, and an intermediate gear 26 that is relatively non-rotatably mounted to the shaft section of the front end part of the spiral shaft 21 and meshes with a small-diameter gear 25b. The stepped gear 25 rotates around an axis that is parallel to the pinion gear 9. The large-diameter gear 25a is a helical gear that meshes with the pinion gear 9. The small-diameter gear 25b is a helical gear that meshes with the intermediate gear 26.

As shown in FIG. 1, the pinion gear 9 is disposed on the lower side of the drive gear shaft 8, and the stepped gear 25 and the intermediate gear 26 are disposed on the upper side of the drive gear shaft 8. The shaft part of the front end of the spiral shaft 21 is smaller in diameter than the other parts of the spiral shaft 21. For this reason, the shaft part is configured so that the large-diameter gear 25a and the shaft part of the front end part of the spiral shaft 21 are less likely to interfere with each other. The intermediate gear 26 is a helical gear that is integrally and rotatably mounted to the front end part of the spiral shaft 21. Here, with the small-diameter gear 25b meshing with the large-diameter intermediate gear 26, the rotation of the pinion gear 9 is greatly reduced and transmitted to the spiral shaft 21. Since the speed of the back and forth movement of the spool 4 is greatly reduced with this kind of decelerating mechanism 20, the fishing line can be densely wound.

Figure 4:
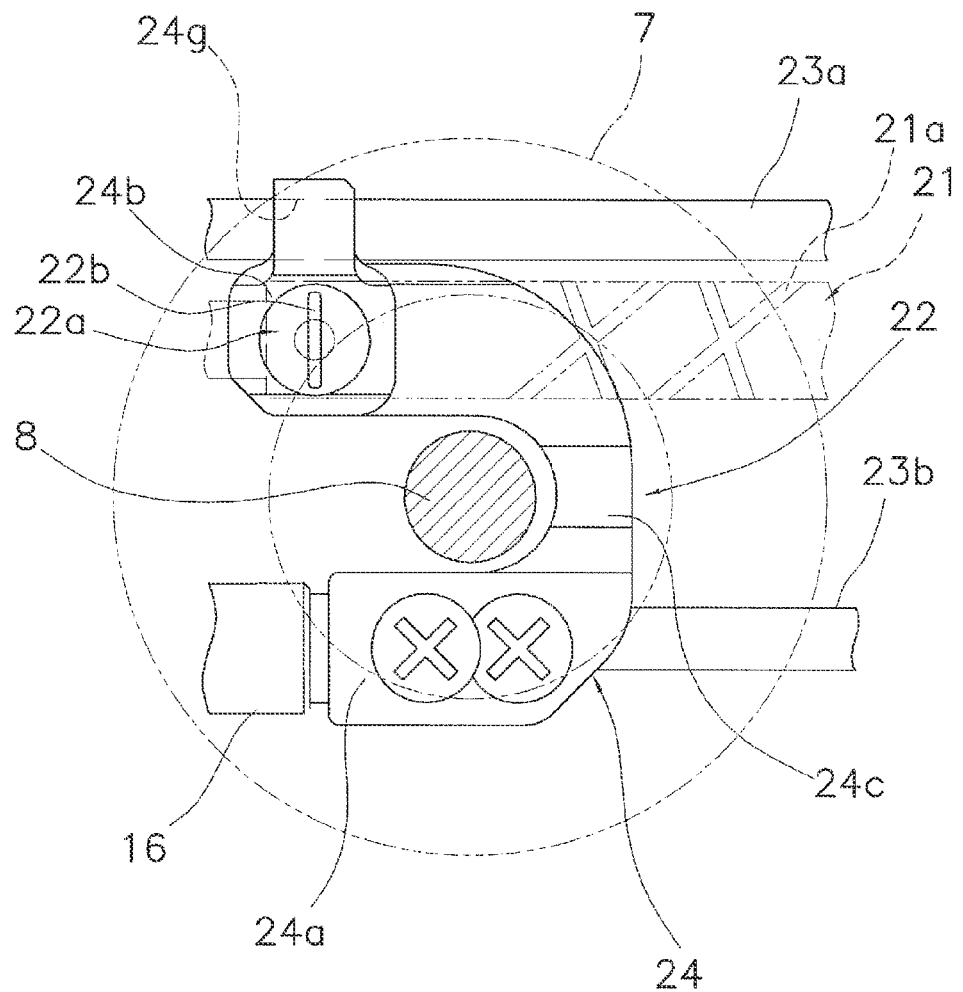
FIG. 4 is an enlarged side view of the slider.

The spiral shaft 21, as shown in FIG. 1 and FIG. 2, is a member on the surface of which is formed intersecting spiral-shaped spiral grooves 21a, and this shaft is disposed so as to be parallel to the spool shaft 16. The spiral shaft 21 is supported on both ends by the rear end of the housing section 10 and the mechanism support portion 10b. Specifically, this shaft is rotatably supported by the housing section 10 via an axle bearing 42 that is mounted to the mechanism support portion 10b of the housing section 10 and an axle bearing 43 that is mounted to the rear end of the housing section 10. The spiral shaft 21 is mounted from the rear of the housing section 10. The spiral shaft 21, as shown enlarged in FIG. 4, is disposed nearly parallel to the spool shaft 16 and on the reel leg 13a side (the upper side) of the drive gear shaft 8. The spiral shaft 21, as shown in FIG. 3, is disposed facing the gear section 7a of the drive gear 7. The spiral shaft 21 is disposed in a position that is closer to the gear section 7a side (the left side in FIG. 3) than the spool shaft 16.

The slider 22, as shown in FIG. 2, FIG. 3, and FIG. 4, comprises an engaging member 22a that engages the spiral grooves 21a of the spiral shaft 21 and a slider main body 24 to which the engaging member 22a is mounted and that moves back and forth in conjunction with the rotation of the spiral shaft 21. The slider 22 reciprocates in the axial direction of the spool according to the rotation of the spiral shaft 21 with the tip of the engaging member 22a engaging the spiral groove 21a and reciprocates the movement of the spool shaft 16 in conjunction with the rotation of the handle 1.

The engaging member 22a is rotatably mounted to the slider main body 24 by a predefined angle (for example, between around 60 degrees to 100 degrees). The engaging member 22a comprises an engaging section 22b on the tip side and a mounting shaft section 22c that is smaller in diameter than the engaging section 22b. This engaging section 22b engages the spiral groove 21a of the spiral shaft 21, and the small-diameter mounting shaft section 22c on the proximal end side is rotatably supported by a bush 22d that is mounted to the slider main body 24. The proximal end part of the engaging member 22a is stopped by a plate-like member 22e that is screwed onto the slider main body 24. The engaging member 22a is inserted from the opening of the reel main body 2 on the second lid member 12 side. The engaging member 22a is assembled in the order of the slider main body 24 and the engaging member 22a from the mounting side of the second lid member 12.

The slider main body 24, as shown in FIG. 2 and FIG. 4, comprises a first mounting section 24a to which the rear end part of the spool shaft 16 is mounted so as to be non-rotatable and immovable in the axial direction, a second mounting section 24b to which the engaging member 22a is mounted via the bush 22d, and a coupling section 24c that couples the first mounting section 24a and the second mounting section 24b.

The first mounting section 24a comprises a D-shaped coupling hole 24d to which the rear end part of the spool shaft 16 is integrally attached and so as to be movable in the axial direction, as well as a second guide hole 24e that is guided by the second guide shaft 23b. The coupling hole 24d and the second guide hole 24e are disposed in parallel. The rear end part of the spool shaft 16 is inserted in the coupling hole 24d and is fastened to the slider main body 24 by two screw members.

The second mounting section 24b comprises a housing hole 24f that houses the engaging member 22a and the bush 22d, as well as a first guide hole 24g that is guided by the first guide shaft 23a. The housing hole 24f and the first guide hole 24g are disposed in a crisscross direction. The engaging member 22a is rotatably housed in a range that is regulated by the housing hole 24f.

As shown in FIG. 4, when the spool 4 is disposed in the most forward position, the coupling section 24c couples the first mounting section 24a and the second mounting section 24b in a curved manner, so that the first mounting section 24a and the second mounting section 24b are disposed above and below the drive gear shaft 8 to sandwich the drive gear shaft. Specifically, the first mounting section 24a, which is the fixed part of the spool shaft 16, is disposed on the lower side on the opposite side of the fishing rod mounting side of the drive gear shaft 8, and the second mounting section 24b, which is the mounting part of the engaging member 22a, is disposed on the upper side of the drive gear shaft 8.

The first mounting section 24a and the second mounting section 24b are disposed so that they are positioned in front of the drive gear shaft 8 when the spool shaft 16 is in the most forward position. The second mounting section 24b is disposed so as to be positioned in front of the first mounting section 24a. The second mounting section 24b, as shown in FIG. 3, is disposed on as to be biased more to the second lid member 12 side (the right side in FIG. 3) than the first mounting section 24a. The coupling section 24c, as shown in FIG. 4, is formed to be a nearly U-shape following the outer peripheral part of the cylindrical drive gear shaft 8, so that the inner peripheral part is a shape following the outer peripheral part of the drive gear shaft 8.

The slider main body 24, as shown in FIG. 3, is disposed opposing only the outer periphery of the spiral shaft 21 of the side that is away from the gear section 7a (the right side in FIG. 3). Here, the spiral shaft 21 is disposed facing the gear section 7a of the drive gear 7, and the slider main body 24 is installed opposing only the outer periphery of the spiral shaft 21 of the side that is away from the gear section 7a. The spiral shaft 21 is disposed opposing the slider main body 24, so that the shaft is disposed, toward the right direction in FIG. 3, in the order of the gear section 7a of the drive gear 7, the spiral shaft 21, the engaging member 22a, and the slider main body 24.

The first guide shaft 23a and the second guide shaft 23b, as shown in FIG. 1, FIG. 2, and FIG. 3, each extends through the first guide hole 24g and the second guide hole 24e of the slider main body 24 and guide the slider 22 along the spool shaft 16. The first guide shaft 23a and the second guide shaft 23b are supported at both ends by the rear end of the housing section 10 and the mechanism support portion 10b. The first guide shaft 23a and the second guide shaft 23b are mounted from the rear of the housing section 10. The first guide shaft 23a is disposed above the engaging section 22b of the engaging member 22a, as shown in FIG. 3, and is proximate to the spiral shaft 21 in a direction approaching the reel leg 13a. Additionally, the second guide shaft 23b is disposed so as to overlap the side of the spool shaft 16 that is away from the drive gear 7 more on the second lid member 12 side than the first guide shaft 23a. By disposing the first guide shaft 23a proximate to the engaging section 22b, the distance between the engaging section 22b and the spiral groove 21a can be maintained constant without supporting the slider main body 24 with the spool shaft 21, so that the engaging state of the engaging member 22a will be less likely to vary. Additionally, by disposing the second guide shaft 23b on the side of the spool shaft 16, the dead space on the side of the spool shaft 16 can be effectively utilized, making this less likely to affect the lateral width of the reel main body 2 even when installing a second guide shaft 23b. Furthermore, this configuration is less likely to affect the size of the reel main body 2 in the vertical direction. In the present embodiment, the first guide shaft 23a that is disposed on the upper side is partially retained and stopped by the retainer plate 15. The second guide shaft 23b that is disposed on the lower side is retained and stopped by the head of the screw member 46 that is screwed to the rear surface of the housing section 10.

The rotor 3, as shown in FIG. 1, comprises a rotor body 35 that is rotatably mounted to the reel main body 2 via the pinion gear 9 and a bale arm 34 that is pivotally mounted to the rotor body 35. The rotor body 35 is, for example, made of an aluminum alloy and comprises a tubular support section 30 that is fixed to the pinion gear 9 and a first rotor arm 31 and a second rotor arm 32 that each extends forward from an opposing position on the outer peripheral surface of the rear end part of the support section 30, spaced apart from the support section 30. The support section 30, first rotor arm 31, and the second rotor arm 32, which configure the rotor body 35, are, for example, made of aluminum alloy and are integrally molded by die-cast molding. The outer peripheral sides of the first rotor arm 31 and the second rotor arm 32 are, as shown in FIG. 1, each covered by a first cover member 36 and a second cover member 37. A first bale support member 40 and a second base support member 41 are pivotally supported by the outer peripheral sides of the tips of the first rotor arm 31 and the second rotor arm 32, respectively, and form the bale arm 34. The bale arm 34 is disposed to smoothly guide the fishing line to the spool 4 and to wind the fishing line to the spool 4. The bale arm 34 can be pivoted between a line guiding position and an inverted line releasing position.

The rotor 3, as shown in FIG. 1, can prohibit the reversal of the line release direction and can also release the prohibition with the reverse rotation prevention mechanism 50. The reverse rotation prevention mechanism 50 comprises a roller-type one-way clutch 51 that is mounted to the mechanism support portion 10b of the housing section 10. The one-way clutch 51 can switch between the reverse prohibited state and the reverse permitted state. The reverse rotation prevention mechanism 50 further comprises a switch operation section 52 that switches the one-way clutch 51 between the reverse prohibited state and the reverse permitted state. The switch operation section 52 is pivotally supported by the lower part of the mechanism support portion 10b of the housing section 10.

The spool 4, as shown in FIG. 1, for example, is shallow, groove shaped and made of an aluminum alloy and comprises a reel body 4a onto the outer periphery of which is wound the fishing line, a tubular skirt section 4b is formed on the rear end part of the reel body 4a and has a diameter that is larger than the diameter of the reel body 4a, and a front flange section 4c that is formed at the tip part of the reel body 4a on as to be slightly larger in diameter than the reel body 4a. The reel body 4a is thin-walled and tubular, and annular ribs 4d far reinforcement are formed on the inner peripheral surface in a plurality of positions (for example, in two locations) spaced apart in the axial direction. Additionally, the spool 4 comprises an attachment boss 4e in the center that can be rotatably mounted to the spool shaft 16.

The spool 4 is fixed to the spool shaft 16 by a knob member 27 that screws onto the tip of the spool shaft 16. On the tip of the spool shaft 16 is formed a male thread portion 16a and, at the same time, chamfered sections 16b that are longer than the length of the male thread portion 16a and that are parallel to each other. The knob member 27 comprises a metallic nut member 27a that screws onto the male thread portion 16a of the spool shaft 16 and a synthetic resin knob main body 27b that is integrally formed after inserting the nut member 27a into a mold. The knob main body 27b comprises a boss portion 27c to the inside of which is disposed the nut member 27a, and the boss portion 27c is formed wrapped around to the rear end surface 27d of the nut member 27a. With this, the contact surface between the nut member 27a and the boss portion 27c can be increased, and the nut member 27a becomes less likely to loosen with respect to the boss portion 27c.

The Assembly Procedure for the Reel Main Body

In a spinning reel 100 configured in this way, the screw member 48 is attached to the fourth through-hole 10f beforehand, and the stopper member 38 is fitted to the screw shaft section 48b of the screw member 48. With this, the screw member is retained to the fourth through-hole 10f.

When assembling the spinning reel 100, the rotor drive mechanism 5 and the oscillating mechanism 6 are mounted in the reel main body 2, and at the same time, the reverse rotation prevention mechanism 50 is mounted in the mechanism support portion 10. In this state, the housing section 10 is covered with the first lid member 11 and the second lid member 12, which are fixed to the housing section 10 with a fixing bolt not shown in the figure. Next, the main body guard 14 is mounted from the rear of the housing section 10, the first lid member 11 and the second lid member 12. At this time, the boss portion 14b of the main body guard 14 is inserted into the fitting hole 10h. Then, the shaft part of the screwdriver is inserted from the fifth through-hole, 10k, and the + or the − tip part at the tip of the shaft part is engaged with the screw head 48a. In this state, the main body guard 14 is pressed, the screw member 48 is rotated while pressing down the screwdriver, and the main body guard 14 is fixed to the housing section 10. With this, the assembly of the reel main body 2 is completed. After this, the assembly of the rotor 3 and the spool 4, etc., are conducted, and the assembly of the spinning reel 100 is completed.

Here, the fourth through-hole 10f, through which the screw member 48 extends, is disposed between the screw head 48a of the screw member 48 and the stopper member 38 that is mounted to the screw shaft section 48b. For this reason, the screw member 48 becomes less likely to come off of the fourth through-hole 10f and retaining the screw member 48 to the reel main body 2 with a simple structure becomes possible.

First Modified Example of the First Embodiment

Figure 7:
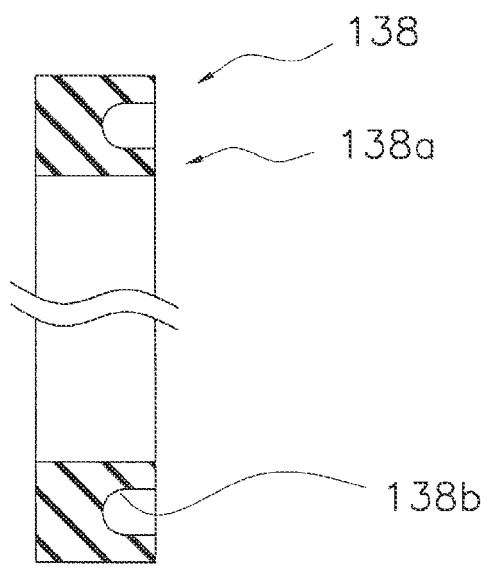
FIG. 7 is a diagram of a first modified example of the elastic body of the first embodiment corresponding to FIG. 6.

In the first embodiment, a commercially available O-ring 38a is the stopper member 38, but the present invention is not limited to this configuration. In a first modified example of the first embodiment, as shown in FIG. 7, the stopper member 138 can be a synthetic rubber O-ring 138a that comprises an annular recess 138b having a U-shaped cross section and having a rectangular outer shape and a nearly C-shaped cross section. In this case, in order to raise the sealing ability, the annular recess 138b can be disposed toward the rear section side.

Second Modified Example of the First Embodiment

Figure 8:
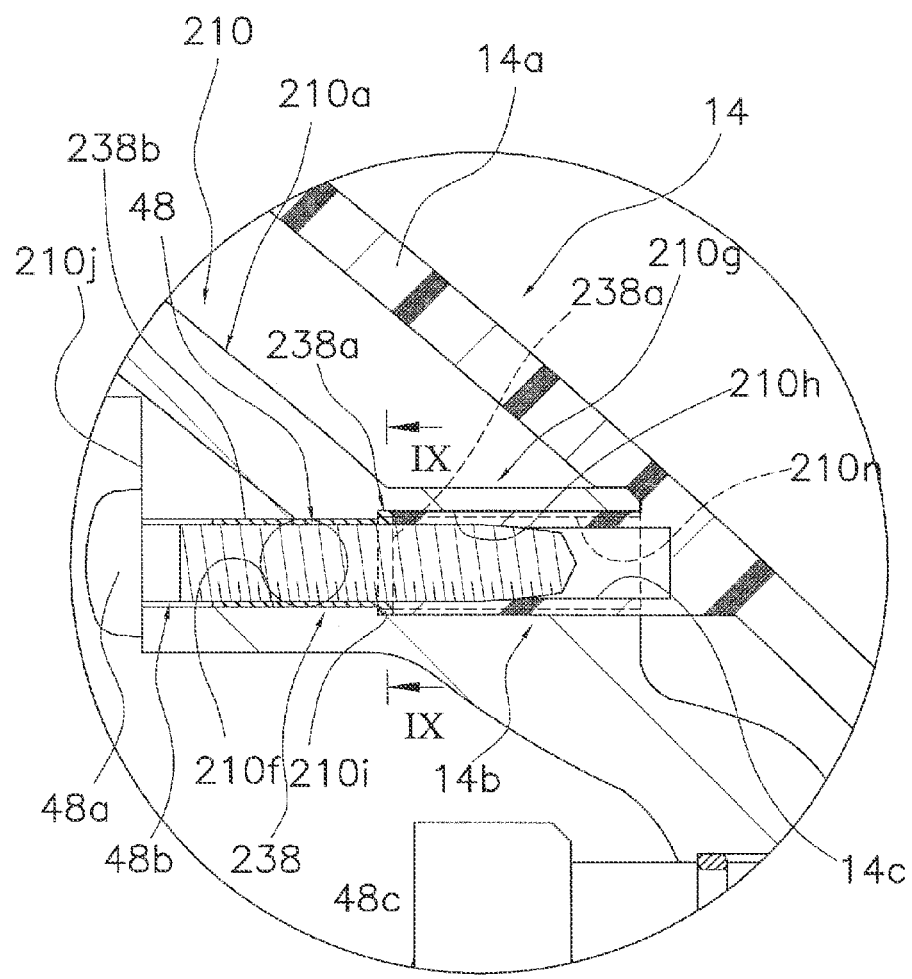
FIG. 8 is a diagram of a second modified example of the first embodiment corresponding to FIG. 5.
Figure 9:
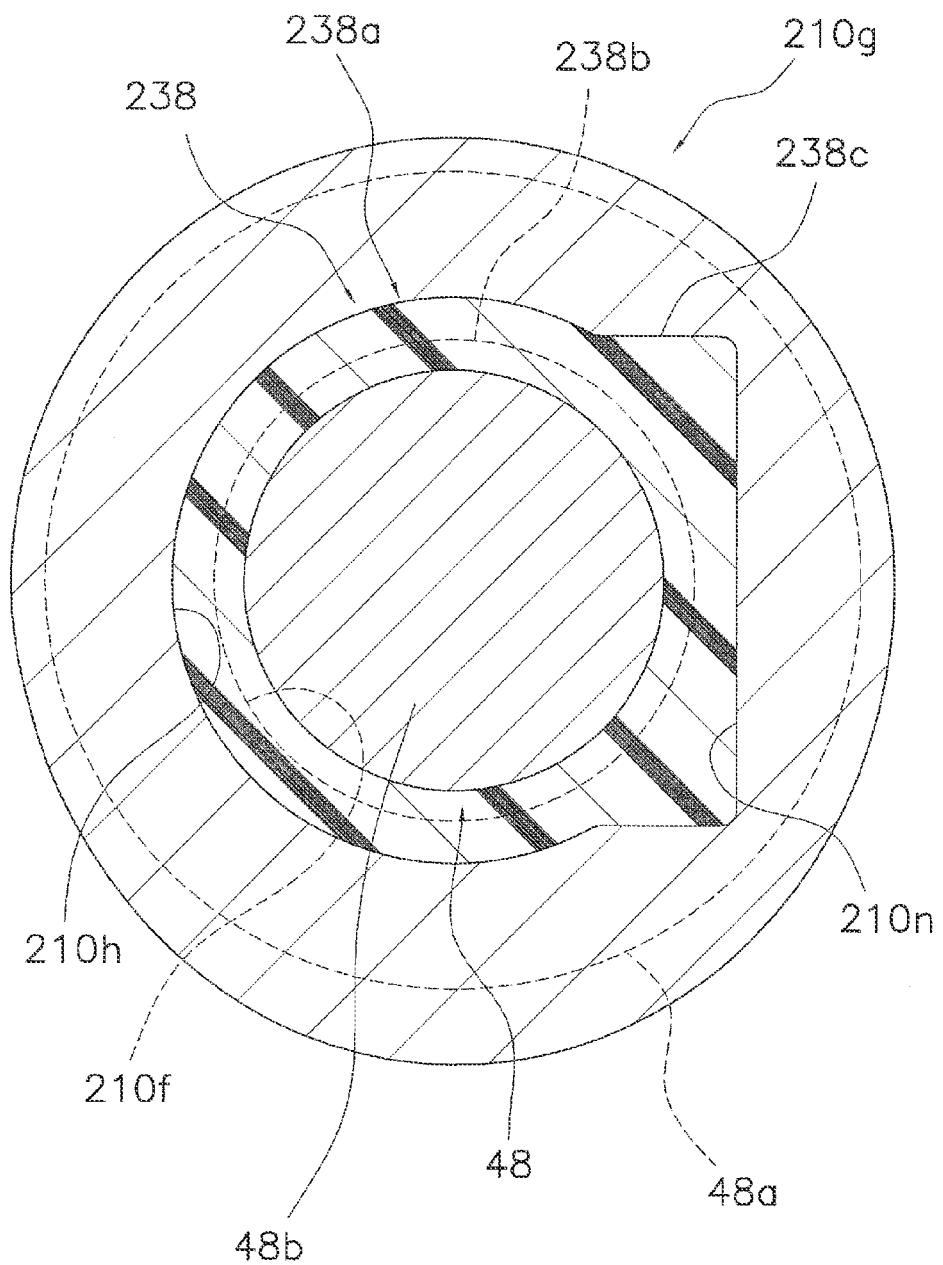
FIG. 9 is a cross-sectional view of the second modified example of the first embodiment along the section line IX-IX in FIG. 8.

In the first embodiment and the first modified example, a highly elastic synthetic rubber O-ring is the stopper member, but the present invention is not limited to this configuration. In a second modified example of the first embodiment, as shown in FIG. 8, a low-elastic synthetic resin collar form stopper member 238 is used. In FIG. 8, the same symbols are given to the members that are the same as those in the second embodiment shown in FIG. 5, and their explanations have been omitted. In FIG. 8, in the second modified example, a stopper member 238 is a hard synthetic resin with a high sealing ability and a high sliding ability, such as polyamide resin, polyacetal, polytetrafluoroethylene, etc. The stopper member 238 comprises a flange section 238a that can come into contact with the stepped surface 210i and is larger in diameter than the fourth through-hole 210f, as well as a tubular section 238b that is smaller in diameter than the flange section 238a. The flange section 238a can be fitted in the fitting hole 210h by clearance fitting. As shown in FIG. 9, the flange section 238a can come into contact with the stepped surface 210i. The flange section 238a comprises a rotation stop protrusion 238c that engages with a rotation stop recess 210n that is installed in the fitting hole 210h. The rotation stop protrusion 238c protrudes rectangularly in the radial direction. The rotation stop protrusion 238c is disposed so that the stopper member 238 will not rotate when screwing the screw member 48 into the stopper member 238.

The outer peripheral part of the tubular section 238b can be fitted in the fourth through-hole 210f by clearance fitting. Additionally, the inner peripheral part of the tubular section 238b is farmed to be slightly smaller in diameter than the male thread portion 48c of the screw shaft section 48b of the screw member 48 (for example, the inner diameter of the tubular section 238b is in the range of 0.5 mm to 1.5 mm and is smaller than the maximum diameter of the male thread portion 48c). With this, by screwing in the screw member 48 by rotating the member, the screw shaft section 48b can pass through the tubular section. When the screw member 48 is screwed into the stopper member 238 when retaining the screw member 48 to the housing section 210, a female thread portion is formed on the inner peripheral surface of the tubular section 238h of the stopper member 238 with a small depth. For this reason, the screw member 48 is screwed to the stopper member 238 and is less likely to come out of the fourth through-hole 10f. Meanwhile, the inner diameter of the screw hole 14c of the main body guard 14 is smaller than the inner diameter of the tubular section 238b.

In a stopper member 238 that is configured in this way, a screw member 48 with a form of a tapping screw can be screwed in while forming a female thread portion with a small depth on the inner peripheral surface of the stopper member 238. For this reason, the screw member 48 becomes even less likely to come off of the housing section 210.

Second Embodiment

In the first embodiment, the main body guard 14 was fixed to the housing section 10 using a dedicated fixing screw member 48, but the present invention is not limited to this configuration.

Figure 10:
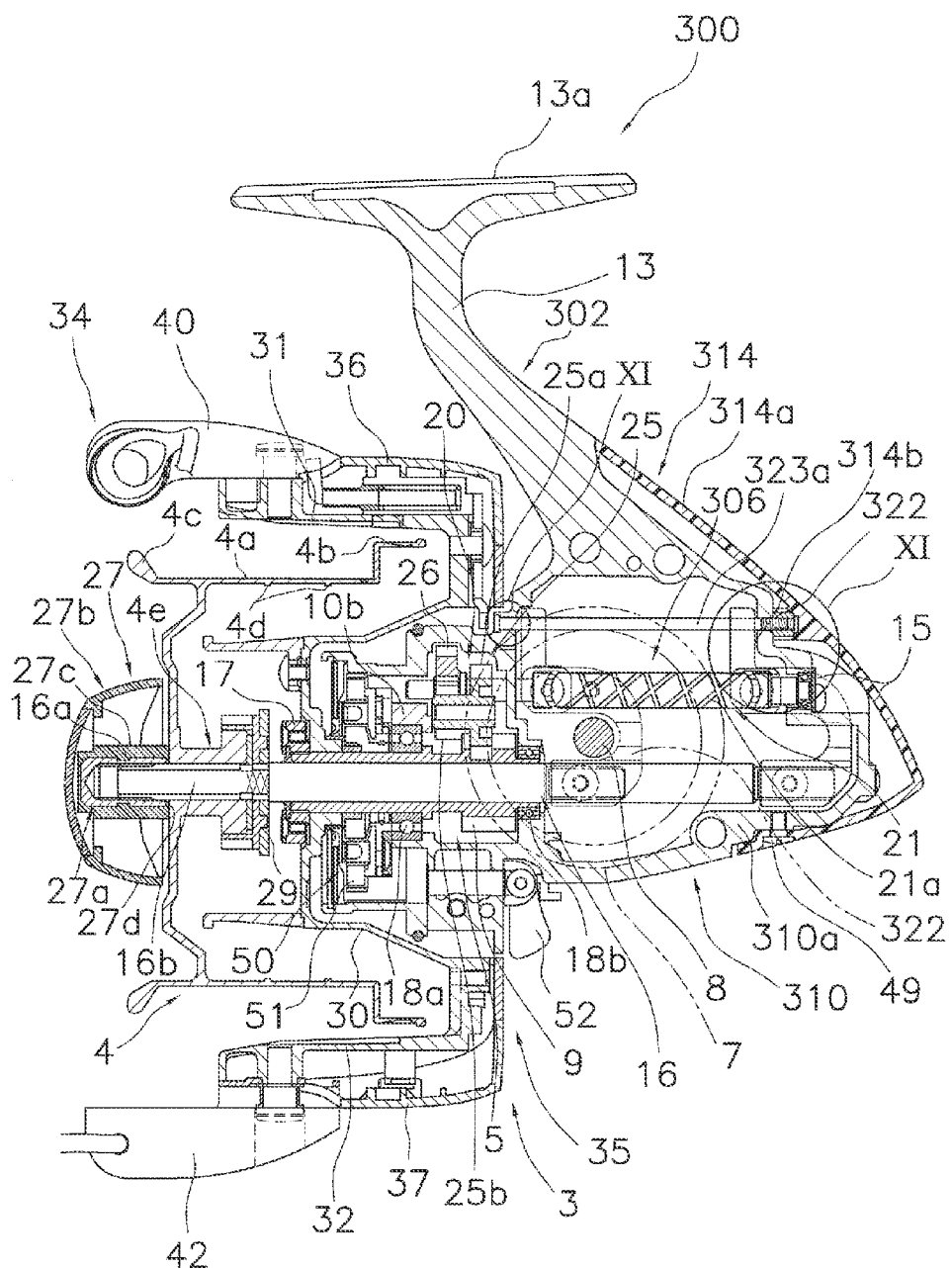
FIG. 10 is a diagram of a spinning reel according to a second embodiment of the present invention corresponding to FIG. 1.

In FIG. 10, a housing section 310 of a reel main body 302 of a spinning reel 300 does not have the guard fitting portion of the first embodiment installed. The boss portion 314b of the main body guard 314 abuts the rear end surface of the peripheral wall 310a. On the peripheral wall 310a on the rear end side of the fourth through-hole 310f is installed a circular mounting recess 310i to which is mounted an O-ring 338a as a stopper member 338.

Figure 11:
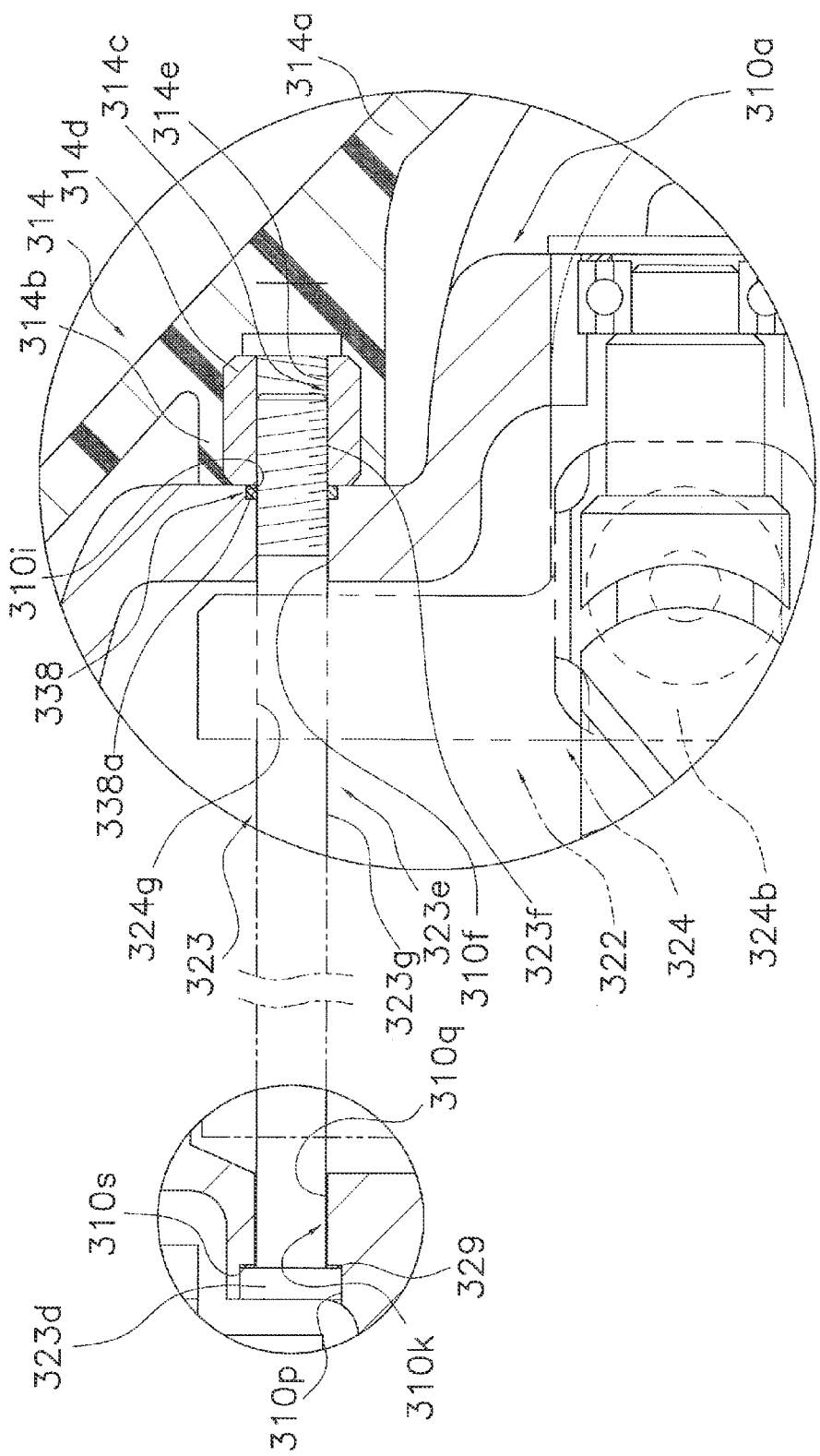
FIG. 11 is an enlarged view of part XI in FIG. 10.

A first guide shaft 323a of the oscillating mechanism also functions as the screw member of the present invention for fixing the main body guard 314. The main body guard 314 comprises a gear section 314a and a boss portion 314b. Additionally, a screw hole 314c of the main body guard 314, as shown in FIG. 11, is configured on the inner peripheral surface of a nut member 314d that is, for example, insert molded to the boss portion 314b. Therefore, the screw hole 314c comprises a female thread portion 314e.

The first guide shaft 323a comprises a large-diameter screw head 323d on one end and a screw shaft section 323e that extends from the screw head 323d toward the other end. The screw shaft section 323e comprises a male thread portion 323f that screws onto a female thread portion 314e on the other end. The screw shaft section 323e further comprises a gear section 3232 between the male thread portion 323f and the screw head 323d. The gear section 323g extends through a first guide hole 324g of the slider main body 324. The first guide shaft 323a fits in the first guide hole 324g that is installed on the upper part of the second mounting section 324b of the slider main body 324 of the slider 322 and guides the slider 322 in the back-and-forth direction. The first guide hole 324g is disposed above the first guide hole 24g of the first embodiment. The first guide shaft 323a is mounted to the fourth through-hole 310f after passing through from the fifth through-hole 310k installed to the front part of the housing section 310 to the first guide hole 324g.

Additionally, the stopper member 338 is mounted to the outer peripheral part of the male thread portion 323f. The stopper member 338 is installed to prevent the first guide shaft 323a from coming off of the housing section 310. The stopper member 338 also comprises a sealing function that prevents foreign matter from entering from the outside of the fourth through-hole 310f into the reel main body 302. The stopper member 338 is a synthetic rubber O-ring 338a that is the same as in the first embodiment.

The screw head 323d is locked to the fifth through-hole 310k. The fifth through-hole 310k comprises a large-diameter section 310p, a small-diameter section 310q, and a stepped surface 310r between the large-diameter section 310p and the small-diameter section 310q. A sheet packing 329 that comes into contact with the screw head 323d is mounted to the stepped surface 310r. The sheet packing 329 is installed to prevent foreign matter from entering into the reel main body 302 from the gap between the fifth through-hole 310k and the screw head 323d.

Here, since the screw member for attaching the main body guard 314 to the housing section 310 of the reel main body 302 and the first guide shaft 323a of the oscillating mechanism 306 can be commonly used, the attaching structure for the main body guard 314 becomes simple.

Other Embodiments

One embodiment of the present invention was described above, but the present invention is not limited to the above-described embodiment; various modifications can be made without departing from the scope of the invention. Specifically, the various embodiments and modified examples described in the present Specification can be freely combined according to necessity.

(a) In the above-described embodiment, a spinning reel for surf casting was described as an example, but the present invention is not limited to this configuration. This invention can be applied to all spinning reels having a traverse cam-type oscillating mechanism 6 comprising a guide shaft, such as a front drag type, a rear drag type, a lever brake type, etc.

(b) In the above-described embodiment, a collar comprising an O-ring and a flange section is described as an example of a stopper member, but the stopper member is not limited to this. For example, a sealing member made of an elastic body and having a tapered lip can be used as the stopper member. The stopper member can also be configured by a circular coil spring.

(c) In the above-described embodiment, the lower part of the main body guard 14 is fixed by a screw member 49, but the present invention is not limited to this. For example, the lower part of the main body guard can be locked to the housing section.

(d) In the above-described embodiment, the reel main body 2 is formed by a housing section 10, a first lid member and a second lid member, but the present invention is not limited to this configuration. For example, the housing section and the first lid member (or the second lid member) can be integrally formed, and the second lid member (or the first lid member) can be installed separately. In this case, the second lid member (or the first lid member) can be fixed to the housing section by a screw member that is disposed in a location that is hidden by the rotor 3 and the main body guard 14, etc.

(e) in the above-described embodiment, the stopper member 38 that is formed by an O-ring 38a is made from a synthetic rubber with a high elasticity and the stopper member 238 comprising a flange section 238a was made from a synthetic resin with a low elasticity, but the present invention is not limited to this configuration. Conversely, the stopper member formed by an O-ring can be made from a synthetic resin with a low elasticity, and the stopper member comprising a flange section can be made from a synthetic rubber with a high elasticity.

The embodiment described above can be expressed as the following.

(A) The spinning reel 100 is a reel that can forwardly unreel a fishing line. The spinning reel 100 comprises a reel main body 2, a screw member 48, a stopper member 38, and a main body guard 14. To the reel main body 2 is rotatably mounted a handle 1 for winding the fishing line. The reel main body 2 comprises a peripheral wall 10a and a fourth through-hole 10f that penetrates the peripheral wall 10a in the back-and-forth direction. The screw head 48a is disposed on one end (e.g., a first end) and can come into contact with the inner wall 10j in the periphery of the front end side of the fourth through-hole 10f. The screw shaft section 48b extends from the screw head 48a toward the other end (e.g., a second end) and extends through the fourth through-hole 10f, and on at least one part of this section a male thread portion 48c is disposed. The stopper member 38 is mounted to the screw shaft section 48b and can come into contact with the stepped surface 10i, which is the periphery of the rear end side of the fourth through-hole 10f. The main body guard 14 has a boss portion 14b as a fixed portion that is fixed by the screw member 48 and that covers the rear of the reel main body 2.

In this spinning reel 100, when retaining the screw member 48, the screw member 48 is extended through the fourth through-hole 10f that is installed in the peripheral wall 10a, and the other end of the screw shaft section 48b is protruded from the fourth through-hole 10f. When the stopper member 38 is mounted to the other end of this protruding screw shaft section 48b, the stopper member 38 can come into contact with the stepped surface 10i, which is the periphery of the rear end side of the fourth through-hole 10f, and the screw head 48a of the screw member 48 can come into contact with the inner wall 10j, which is the peripheral wall at the front end side of the fourth through-hole 10f; therefore, with the screw head 48a and the stopper member 38, the screw member 48 is less likely to come off of the fourth through-hole 10f. Here, since the fourth through-hole 10f is disposed between the screw head 48a and the stopper member 38 that is mounted to the screw shaft section 48b, the screw member 48 is less likely to come off of the fourth through-hole 10f, and retaining the screw member 48 on the reel main body 2 with a simple structure becomes possible.

(B) The stopper member 38 can be made of an elastic body. In this case, since the stopper member 48 can be elastically mounted to the screw member 38, attaching the stopper member 38 is easy.

(C) The stopper member 38 can be made of synthetic resin. In this case, obtaining a stopper member with 38 a shape that matches the screw member 48 becomes easy.

(D) The stopper member 38 can be an O-ring 38a through Which the screw member 48 can extend. In this case, the O-ring 38a can be elastically mounted to the screw member 48; if a commercially available sealing O-ring is used, a cheap stopper member 38 can be obtained, and the fourth through-hole 10f can be sealed.

(E) The stopper member 238 can also comprise a flange section 238a and a tubular section 238b. The flange section 238a has a larger diameter than the fourth through-hole that is installed in the reel main body 2. The boss portion comprises a passage hole on the inner periphery through which the screw member can pass and a boss portion that can be inserted in a through-hole that is installed on the reel main body. In this case, for example, by making the inner diameter of the passage hole slightly smaller than the outer shape of the screw member, the screw member can be retained to the passage hole. Specifically, in the case of using a tapping screw as the screw member, the screw member can be retained by a female thread portion with a weak retaining force.

(F) The fixed section can also comprise a boss portion 14b that is screwed to the male thread portion 48c and that can come into contact with the stopper member 38. In this case, with the boss portion 14b coming into contact with the stopper member 38, the gap between the boss portion 14b, the screw shaft section 48b, and the reel main body 2 can be sealed by the stopper member 38.

(G) The spinning reel 300 can further comprise a spool shaft 16, a spool 4, a rotor 3, a rotor drive mechanism 5, and an oscillating mechanism 306. The spool shaft 16 is movably mounted to the reel main body 302 along the back-and-forth direction. The spool 4 is installed on the front end part of the spool shaft 16 and can have fishing line wound on the outer periphery. The rotor 3 is rotatably installed on the outer peripheral side of the spool 4 and winds the fishing line to the spool 4 according to the rotation of the handle 1. The rotor drive mechanism 5 transmits the rotation of the handle 1 to the rotor 3 and rotates the rotor 3 in conjunction with the rotation of the handle 1. The oscillating mechanism 306 moves the spool 4 in the back-and-forth direction in conjunction with the rotation of the handle 1 via the spool shaft 16. The oscillating mechanism 306 comprises a spiral shaft 21 and a slider 322. On the outer peripheral section of the spiral shaft 21 is formed a spiral groove 21a that rotates in conjunction with the rotation of the handle 1. The slider 322 engages with the spiral groove 21a of the spiral shaft 21 and moves back and forth in conjunction with the rotation of the spiral shaft 21. The screw shaft section 323e further comprises a guide section 3232 that guides the back-and-forth movement of the slider 322 between the screw head 323d and the male thread portion 323f.

In this case, since the screw member for attaching the main body guard 314 to the reel main body 302 and the first guide shaft 323a of the oscillating mechanism 306 can be commonly used, the attaching structure for the main body guard 314 is simple.

What is claimed is:

1. A spinning reel for forwardly unreeling a fishing line, comprising:
  a reel main body having a peripheral wall and a through-hole, the through-hole having a front end side, a rear end side and extending through the peripheral wall in a longitudinal direction of the spinning reel;
  a handle configured to wind the fishing line, and being rotatably mounted to the reel main body;
  a screw member having a first end, a second end, a screw head disposed on the first end, a screw shaft section extending from the screw head toward the second end, and male threads disposed on the screw shaft section, the screw head contacting the peripheral wall at the front end side of the through-hole and the screw shaft section extending through the through-hole;
  a stopper member mounted to the screw shaft section and contacting a periphery of the rear end side of the through-hole; and
  a cover member having a fixed section fixed by engaging the screw member, and covering a rear of the reel main body.

2. The spinning reel recited in claim 1, wherein the stopper member is an elastic body.

3. The spinning reel recited in claim 1, wherein the stopper member is synthetic resin.

4. The spinning reel recited in claim 1, wherein the stopper member is an O-ring through which the screw member extends.

5. The spinning reel recited in claim 1, wherein
the stopper member comprises
a flange section disposed on the reel main body and having a diameter larger than a diameter of the through-hole, and
a tubular section including an inner periphery and an outer periphery, the screw section passing through the inner periphery of the tubular section and the outer periphery of the tubular section enabling the tubular section to be fitted to the through-hole.

6. The spinning reel recited in claim 5, wherein
the flange section comprises a rotation stop portion configured to stop rotation of the stopper member by contacting the reel main body.

7. The spinning reel recited in claim 1, wherein
the fixed section comprises a boss portion screwed to the male thread portion and configured to contact the stopper member.

8. A spinning reel for forwardly unreeling a fishing line, comprising:
- a reel main body having a peripheral wall and a through-hole, the through-hole having a front end side, a rear end side and extending through the peripheral wall in a longitudinal direction of the spinning reel;
- a handle configured to wind the fishing line, and being rotatably mounted to the reel main body;
- a screw member having a first end, a second end, a screw head disposed on the first end, a screw shaft section extending from the screw head toward the second end, and male threads disposed on the screw shaft section, the screw head contacting the peripheral wall at the front end side of the through-hole and the screw shaft section extending through the through-hole;
- a stopper member mounted to the screw shaft section and contacting a periphery of the rear end side of the through-hole;
- a cover member having a fixed section fixed by the screw member, and covering a rear of the reel main body;
- a spool shaft including a front end part, and being movably mounted to the reel main body along the longitudinal direction,
- a spool disposed on the front end part of the spool shaft and being configured to have a fishing line wound around an outer periphery thereof,
- a rotor rotatably disposed on the outer peripheral side of the spool and being configured to wind the fishing line to the spool based on rotation of the handle,
- a rotor drive mechanism configured to transmit the rotation of the handle to the and to rotate the rotor in conjunction with the rotation of the handle, and
- an oscillating mechanism configured to move the spool back and forth in conjunction with the rotation of the handle via the spool shaft, the oscillating mechanism comprising
- a spiral shaft having a spiral groove disposed on an outer peripheral section thereof and being configured to rotate in conjunction with the rotation of the handle, and
- a slider configured to engage the spiral groove of the spiral shaft and move back and forth in conjunction with the rotation of the spiral shaft, and
- the screw shaft section comprising a guide section configured to guide the movement back-and-forth of the slider between the screw head and the male thread portion.

* * * * *